United States Patent Office 2,957,749
Patented Oct. 25, 1960

2,957,749

MANUFACTURE OF LITHIUM TETRABORATE

William T. Reburn, Trona, and William A. Gale and Edward C. Cecil, Whittier, Calif., assignors to American Potash & Chemical Corporation, a corporation of Delaware No Drawing. Filed Jan. 16, 1958, Ser. No. 709,198

7 Claims. (Cl. 23—59)

This invention relates in general to the production of lithium tetraborate and more particularly to the production of a crystalline anhydrous lithium tetraborate from lithium hydroxide monohydrate and boric acid.

Attempts which have been made in the past to produce crystalline lithium tetraborate have resulted in the production of a nearly colloidal lithium tetraborate of variable water content which, upon calcining to remove the accompanying water, became an extremely fine powder that was both difficult and disagreeable to handle.

The reason for the formation of a near colloidal lithium tetraborate hydrate is the extreme readiness with which lithium tetraborate forms supersaturated solutions which are very stable. Hence, it is extremely difficult to relieve supersaturation and precipitate crystalline hydrated lithium tetraborate.

Precipitation of hydrated lithium tetraborate from supersaturated solutions has previously been accomplished by the addition of an organic solvent such as alcohol, etc., to the supersaturated lithium tetraborate solution to force the salt out of solution. The hydrated, almost colloidal material so produced contained excessive amounts of water associated with it, necessitating the consumption of relatively large amounts of fuel to dehydrate the salt to make it suitable for sale to the trade.

It is therefore an object of this invention to provide a method for the production of both crystalline lithium tetraborate and anhydrous lithium tetraborate.

It is a further object of the invention to provide a method for the production of lithium borate from lithium hydroxide and boric acid.

Still another object of the invention is to provide a method for the preparation of lithium tetraborate in either a crystalline or an anhydrous form, either form being far easier to handle than the colloidal salt which has heretofore been produced.

Other objects and advantages of this invention, if not specifically set forth, will become apparent during the course of the detailed description which follows.

Generally, the invention to be described in greater detail below involves the adding of lithium hydroxide and boric acid to a solution saturated with respect to lithium tetraborate (preferably the recycled mother liquor described infra) said solution being held at a convenient temperature, heating the slurry so formed to form a supersaturated solution of lithium tetraborate, boiling the supersaturated solution so formed for a period of time sufficient to remove the water produced by the lithium hydroxide-boric acid reaction and to precipitate a crop of crystalline lithium tetraborate trihydrate from the solution, slowly cooling the slurry to a suitable temperature for dewatering, this cooling step being carefully carried out over an extended time period so as to prevent the appearance of objectionable lithium metaborate octahydrate, and thereafter dewatering by centrifuging or filtering so as to yield the crystalline lithium tetraborate trihydrate. This trihydrate salt may thereafter be calcined to yield the anhydrous lithium tetraborate. The mother liquor obtained in the dewatering process is recycled and used as the solvent for the lithium hydroxide and boric acid as aforesaid.

More particularly, the invention here involves adding of lithium hydroxide, preferably in the monohydrate form, and boric acid to a recycled mother liquor saturated with lithium tetraborate at a temperature between about 20° C. and 100° C.; 40° C. is a convenient and preferred temperature for this initial step. The slurry is then heated to a temperature of between about 90° C. and 100° C. to yield a solution supersaturated with respect to lithium tetraborate.

Lithium tetraborate trihydrate may be recovered from solutions having $B_2O_3$-to-$Li_2O$ ratios ranging between 1.53 to more than 4.5. However, in this invention, it is preferred to adjust the resulting supersaturated solution to a $B_2O_3$-to-$Li_2O$ ratio of about 2.0 to 1 so that the solid precipitated from the solution and the solution itself are of the same composition. This ratio adjustment eliminates the need for washing the precipitated lithium tetraborate trihydrate and thus reduces the quantity of water which must be evaporated during the process cycle.

The supersaturated solution of lithium tetraborate, which may contain from 6 percent to 25 percent lithium tetraborate in solution, is heated (preferably gently boiled) for a period or from four to eight hours to remove substantially all the excess water which is formed by the lithium hydroxide-boric acid reaction. Thus, the total quantity of water is reduced to that present at the outset of the process. Concurrently, supersaturation of the solution is relieved and a crop of lithium tetraborate trihydrate crystals is precipitated. Also, as an alternative, the solution may be seeded just prior to the time of precipitation of the trihydrate salt from the solution. Seeding much before this is useless as the seeds simply dissolve and pass into solution. This seeding, however, is not absolutely essential.

Following the evaporation and crystallization step, the slurry is slowly cooled to a temperature suitable for dewatering, preferably to within the range 90° C. to 30° C. A convenient and preferred temperature is about 40° C. This cooling should be done at a rate such as to prevent the appearance of lithium metaborate octahydrate or dihydrate. A preferred cooling rate is 10° F. per hour or about 5.5° C. per hour. Actually, however, it is not possible to give exact figures for the cooling rate as this is a function of the extent of supersaturation of the solution at any given time. However, it is easy to ascertain when the maximum permissible rate is being exceeded—at that point, the octahydrate salt ($8H_2O$) or the dihydrate salt ($2H_2O$) either alone or in admixture with one another, will appear. It is believed that the dihydrate is probably the stable one down to a temperature of about 37° C., and the octahydrate salt is stable below this temperature. If the slurry of lithium tetraborate trihydrate is cooled too rapidly, the supersaturation is relieved by the precipitation of the metastable solid phase, lithium metaborate octahydrate or dihydrate, rather than by the precipitation of lithium tetraborate trihydrate.

In addition, a slow cooling rate allows the crystalline lithium tetraborate trihydrate precipitate to grow in size to the maximum possible extent.

Following the slow cooling of the slurry, it is dewatered, preferably by centrifuging, to separate the crystalline lithium tetraborate trihydrate from the mother liquor.

The trihydrate salt is then calcined at a temperature between about 400° C. and 600° C. for one to five hours, depending upon the temperature selected, to give an anhydrous lithium tetraborate.

The mother liquor from the centrifuging opration is returned for use as a solvent for more lithium hydroxide monohydrate and boric acid, and the previously described cycle is repeated.

An example of the process is set forth below for illustrative purposes but is not to be deemed to impose limitations on the scope of the invention other than as set forth in the appended claims.

*Example 1.*—A quantity of 51.0 parts of $LiOH \cdot H_2O$ containing 0.15 part $Li_2CO_3$ and 1.53 parts $H_2O$ were added to 597.6 parts of recycled mother liquor saturated with lithium tetraborate at 40° C., and 146.1 parts of $H_3BO_3$ containing 0.15 part $H_2O$ were then added to the slurry and the slurry heated to dissolve the salts and form a supersaturated solution of lithium tetraborate. The $B_2O_3$-to-$Li_2O$ ratio of the resulting solution was determined and found to be 2.0 to 1. The solution was then gently boiled for 4 hours during which time 52.8 parts of $H_2O$ were evaporated and a crop of lithium tetraborate trihydrate was precipitated. The resulting slurry was allowed to cool overnight at a rate of 8° F. to 10° F. per hour, and was centrifuged the following morning at a temperature of approximately 40° C. The mother liquor was returned to the head of the process to begin a new cycle.

The moist, centrifuged lithium tetraborate trihydrate crystals, 197.0 parts, containing about 10 percent free water in addition to the water of crystallization of the trihydrate were then calcined at a temperature of 400° C. to 500° C. for about 4 hours to give 100.0 parts of anhydrous lithium tetraborate while evaporating 97.0 parts of $H_2O$.

By following the present invention, it is possible to obtain a crystalline salt containing only three molecules of water in contrast to the five or six molecules of water usually associated with the hydrated lithium tetraborate. This trihydrate salt of lithium tetraborate is the stable solid phase in equilibrium with a solution having a $B_2O_3$-to-$Li_2O$ ratio ranging from about 1.53 to over 4.5 above a temperature of 0° C. It can be seen that there will be a relatively large saving in fuel when the trihydrate salt is calcined, compared to the colloidal material, since there is much less water associated with each molecule of lithium tetraborate trihydrate.

Another advantage of this invention is that lithium tetraborate trihydrate is crystalline as compared with the colloidal material produced by a previous method. The particle size of this crystalline lithium tetraborate trihydrate is much larger than the colloidal salt, hence is not a powder and is far more easily handled.

Throughout the specification, it has been indicated that recycled mother liquor should be used as a solvent for the reactants. As is apparent, however, pure water (containing no lithium tetraborate) is used at the outset. This becomes saturated with respect to lithium tetraborate—and, at a great efficiency loss, the mother liquor could be discarded and water containing no lithium tetraborate used as a solvent throughout.

Obviously, many modifications and variations of the invention as hereinbefore set forth may be made without departing from the spirit and scope thereof, and therefore only such limitations should be imposed as are indicated in the appended claims.

We claim:
1. A process for the preparation of lithium tetraborate comprising: adding lithium hydroxide and boric acid to a liquor saturated with respect to lithium tetraborate; heating the slurry so formed to yield a supersaturated solution of lithium tetraborate containing between about 6% and 25% by weight lithium tetraborate; heating the solution so formed to the boiling point and continuing said heating for a period of between about four and eight hours to evaporate between about 0% and 15% of the water present in said solution; slowly cooling the slurry so formed to a temperature between about 30° C. and 90° C. at a rate of about 10° F. per hour whereby to prevent the appearance of metastable solid phase lithium metaborate octahydrate and dihydrate as a precipitate; and centrifuging the slurry so formed whereby to separate crystalline lithium tetraborate trihydrate and a mother liquor.

2. The process of claim 1 wherein said trihydrate salt is thereafter calcined at a temperature between about 400° C. and 600° C. for between about one and five hours to yield anhydrous lithium tetraborate.

3. The process of claim 1 wherein the motor liquor separated on centrifuging said slurry is recycled in said process.

4. A process for the preparation of lithium tetraborate comprising: adding lithium hydroxide and boric acid to a solution saturated with respect to lithium tetraborate; heating the slurry so formed to yield a supersaturated solution of lithium tetraborate containing between about 6% and 25% by weight lithium tetraborate; boiling the solution so formed for between about four and eight hours whereby to evaporate substantially all excess water produced by the lithium hydroxide-boric acid reaction and to precipitate a crop of lithium tetraborate trihydrate crystals; slowly cooling the slurry so formed to a temperature of about 40° C. at a rate of about 10° F. per hour whereby to prevent the appearance of metastable solid phase lithium metaborate octahydrate and dihydrate; thereafter centrifuging the slurry so formed whereby to separate crystalline lithium tetraborate trihydrate and a mother liquor.

5. The process of claim 4 wherein said trihydrate salt is thereafter calcined at a temperature of between about 400° C. and 600° C. for about one to five hours to yield anhydrous lithium tetraborate.

6. The process of claim 4 wherein the mother liquor obtained following the centrifuging operation is recycled in said process.

7. The process of claim 4 wherein the ratio of boric oxide to lithium oxide added to the solution is about 2:1.

References Cited in the file of this patent

FOREIGN PATENTS 423,785    Great Britain _____ Feb. 7, 1935

OTHER REFERENCES

Mellor: "A Comprehensive Treatise on Inorganic and Theoretical Chemistry," Longmans, Green and Co., vol. 5, pages 65, 66 and 69 (1924).